April 26, 1966   J. S. GOLIGHTLY ET AL   3,248,195
METHOD AND APPARATUS FOR BENDING GLASS SHEETS
TO COMPOUND CURVATURES
Filed Jan. 9, 1959   10 Sheets-Sheet 1
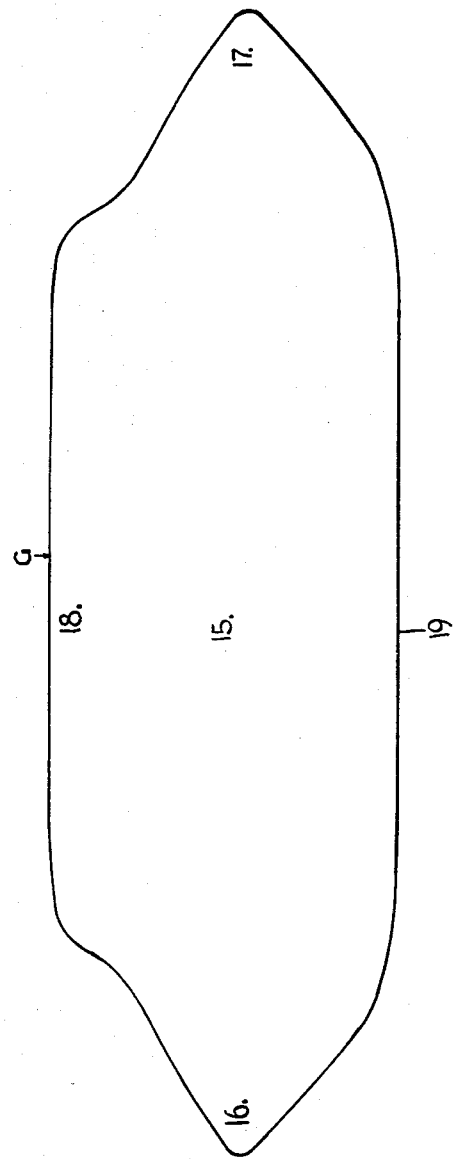
INVENTORS
JAMES S. GOLIGHTLY
HAROLD E. McKELVEY
BY Oscar H. Spencer
ATTORNEY

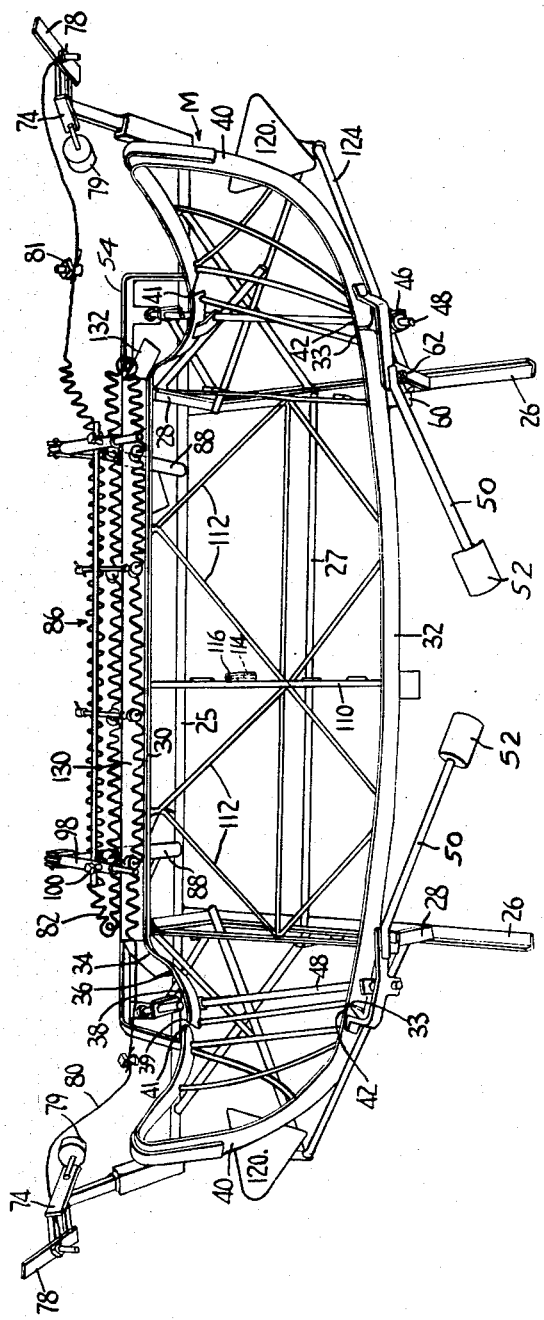

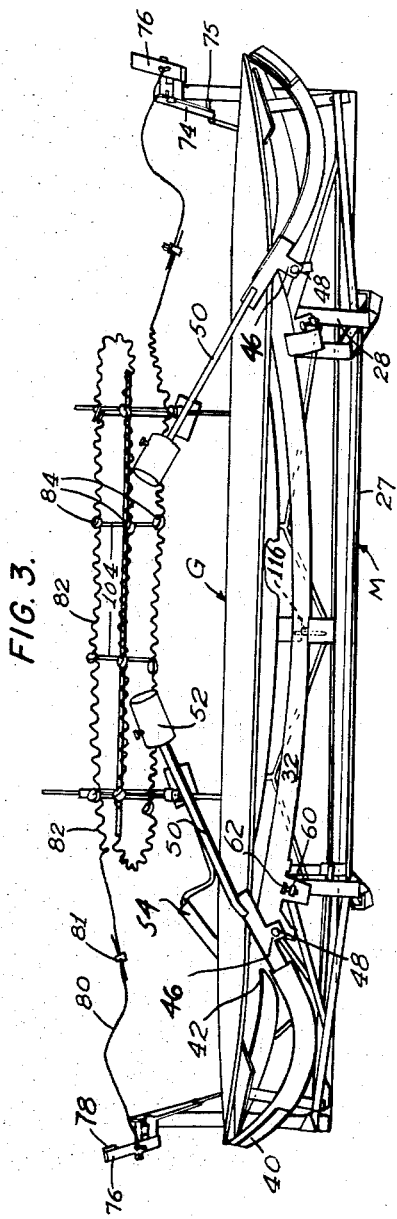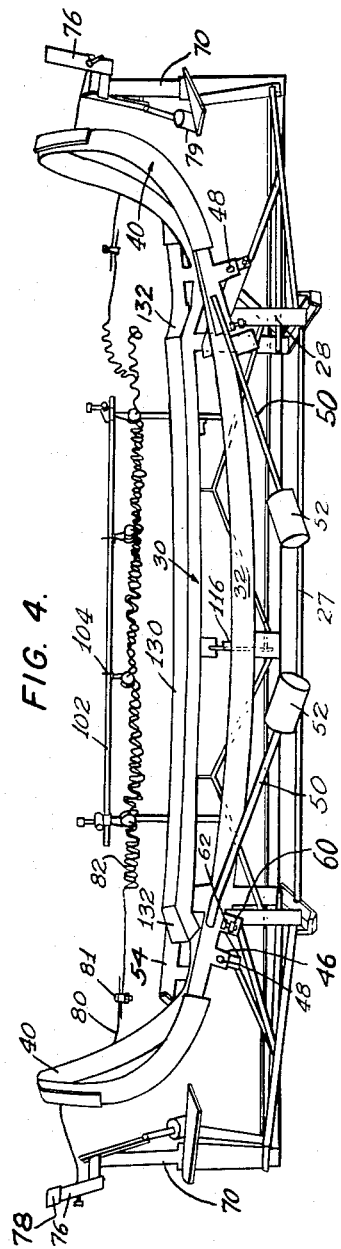
INVENTORS
JAMES S. GOLIGHTLY
HAROLD E. McKELVEY
BY Oscar L. Spencer
ATTORNEY

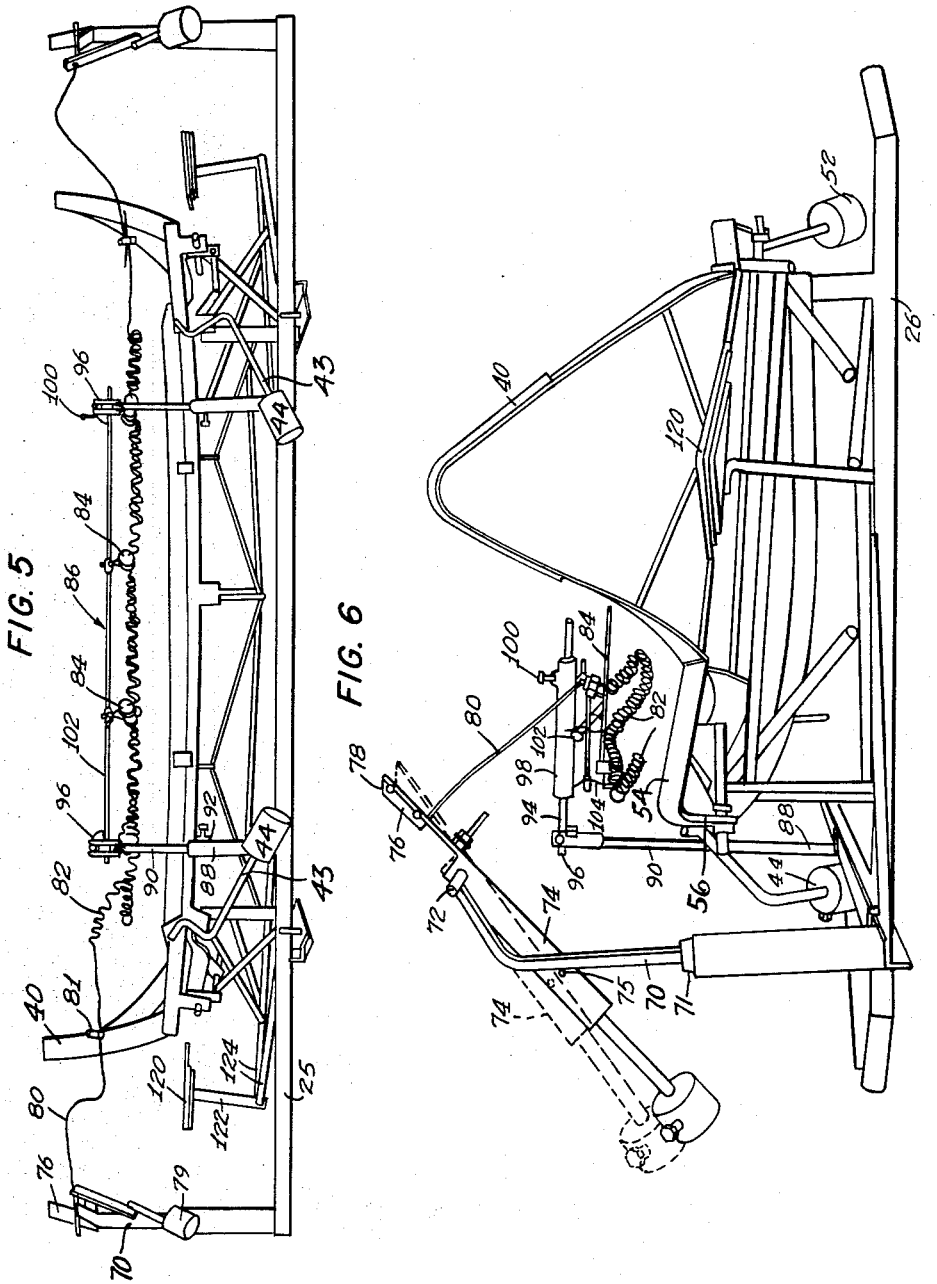

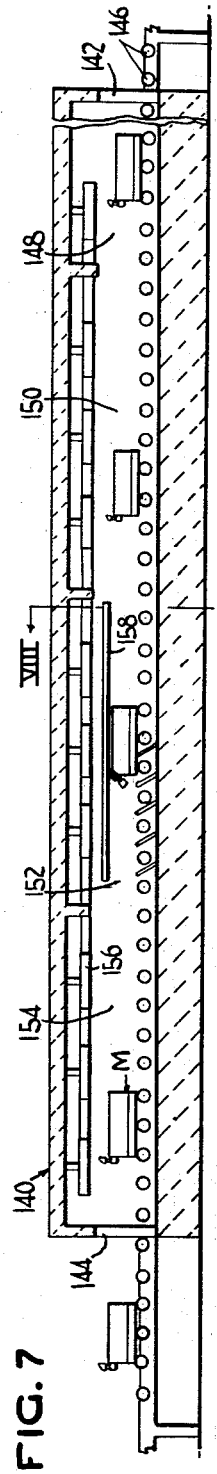
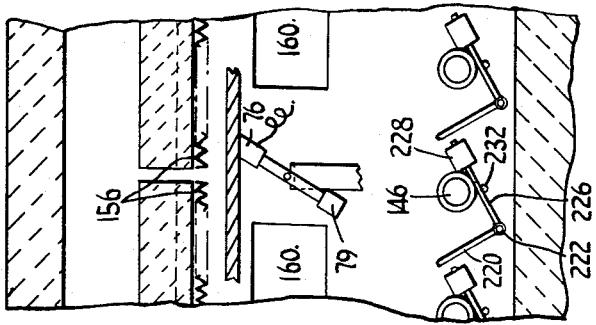
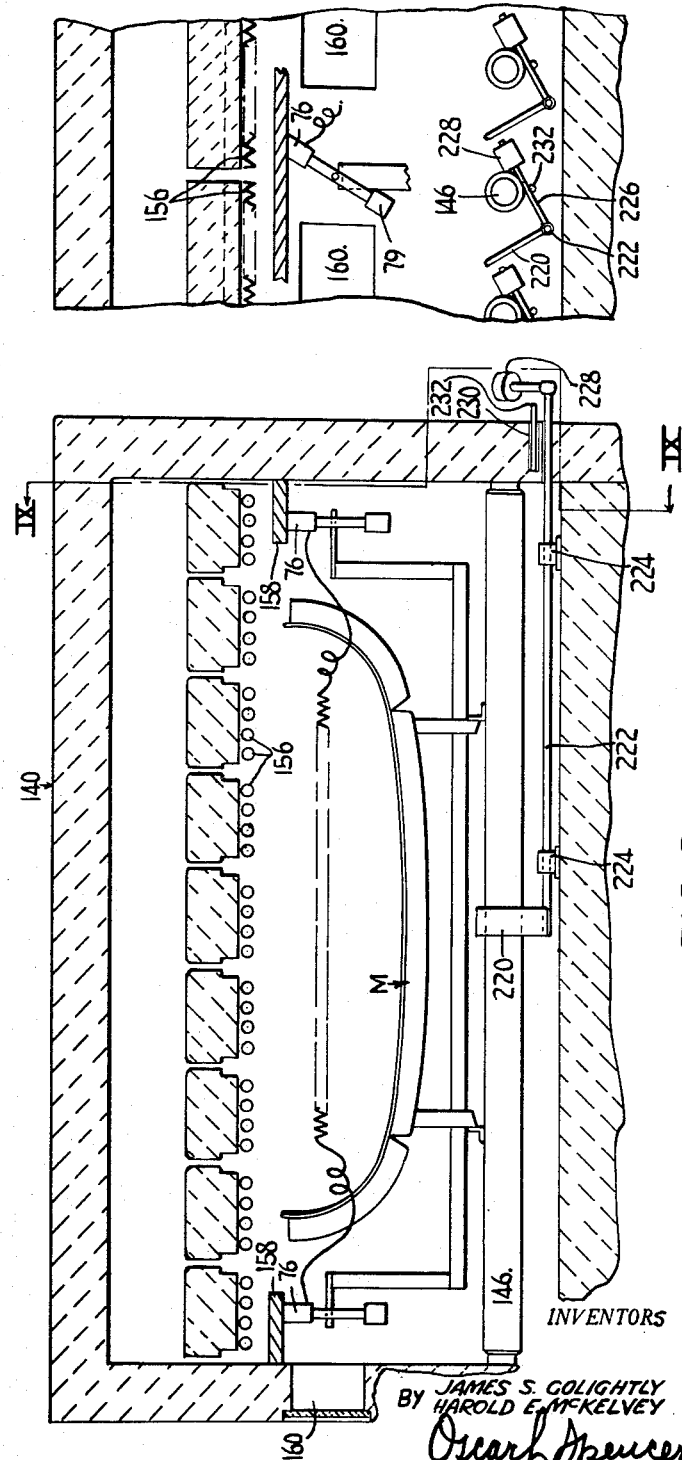
FIG. 7
FIG. 9
FIG. 8
INVENTORS
JAMES S. GOLIGHTLY
BY HAROLD E. McKELVEY
Oscar L. Spencer
ATTORNEY

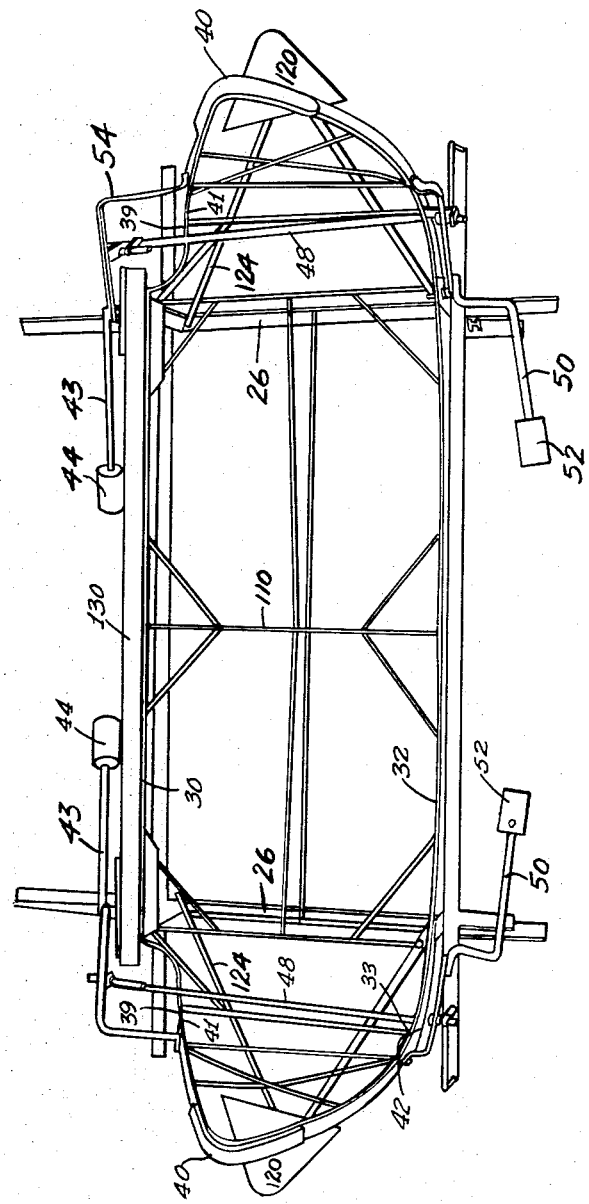

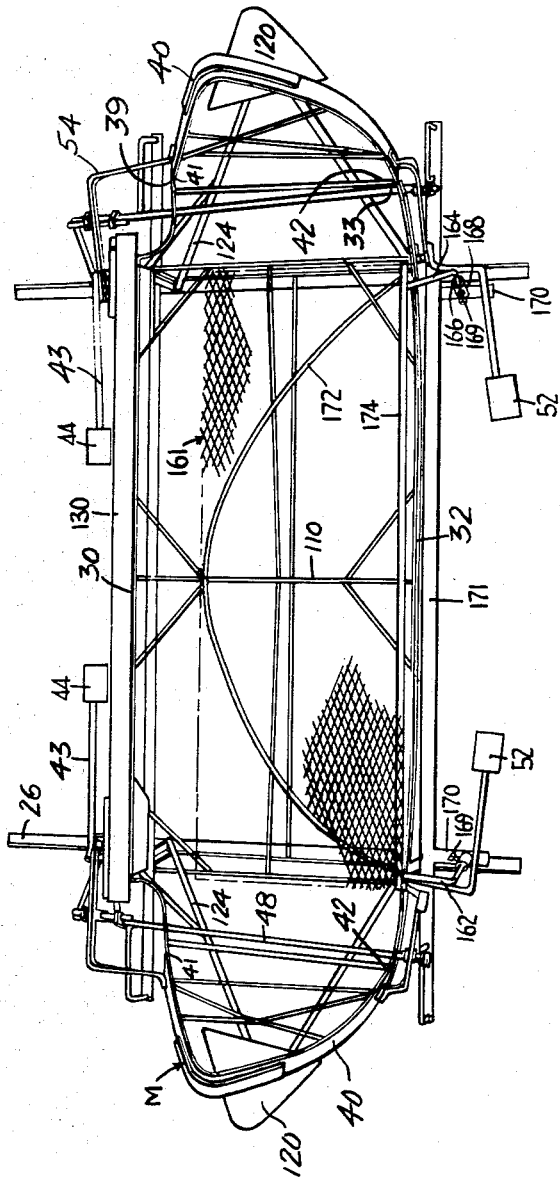

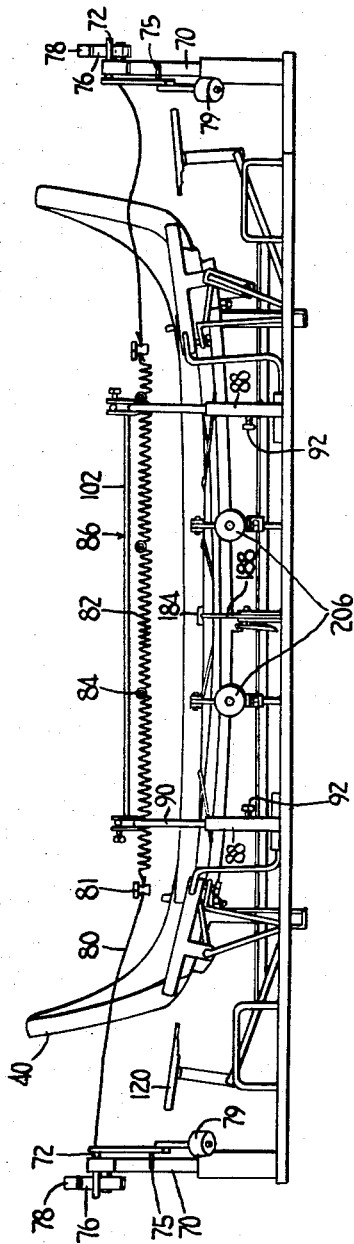

April 26, 1966 J. S. GOLIGHTLY ETAL 3,248,195
METHOD AND APPARATUS FOR BENDING GLASS SHEETS
TO COMPOUND CURVATURES
Filed Jan. 9, 1959 10 Sheets-Sheet 9

INVENTORS
JAMES S. GOLIGHTLY
HAROLD E. MCKELVEY
BY
Oscar L. Spencer
ATTORNEY

April 26, 1966  J. S. GOLIGHTLY ETAL  3,248,195
METHOD AND APPARATUS FOR BENDING GLASS SHEETS
TO COMPOUND CURVATURES
Filed Jan. 9, 1959  10 Sheets-Sheet 10
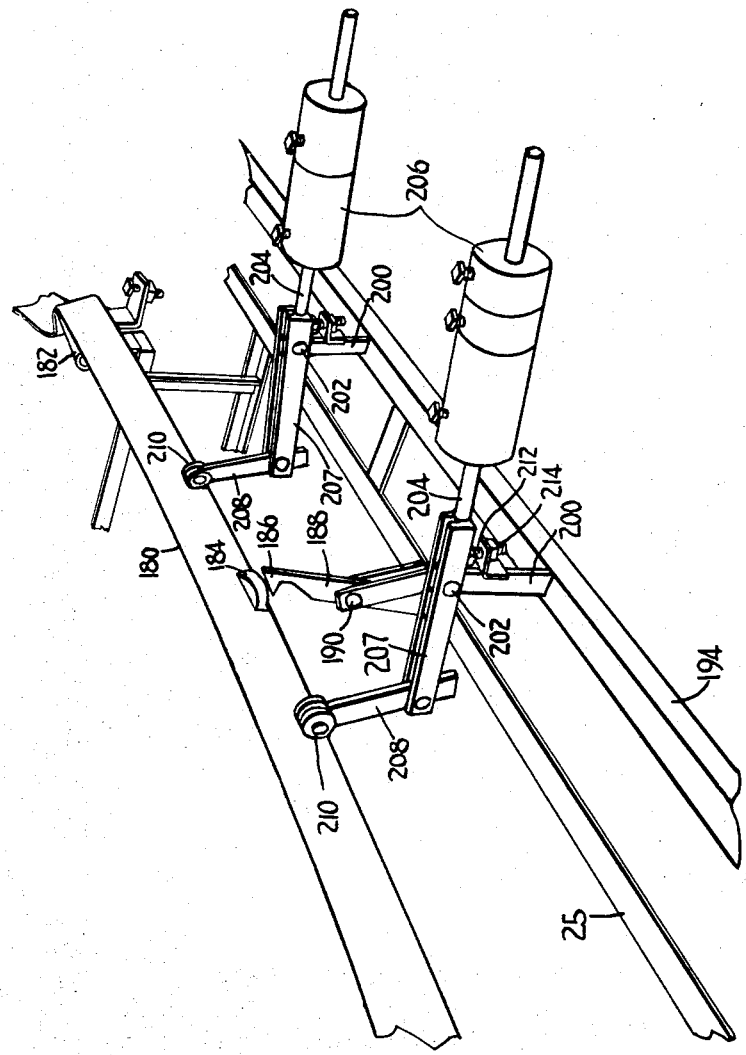
INVENTORS
JAMES S. GOLIGHTLY
HAROLD E. McKLVEY
BY
Oscar H. Spencer
ATTORNEY

United States Patent Office 3,248,195
Patented Apr. 26, 1966

3,248,195
METHOD AND APPARATUS FOR BENDING GLASS SHEETS TO COMPOUND CURVATURES
James S. Golightly, Fox Chapel, and Harold E. McKelvey, Cheswick, Pa., assignors to Pittsburgh Plate Glass Company, Allegheny County, Pa., a corporation of Pennsylvania
Filed Jan. 9, 1959, Ser. No. 785,893
15 Claims. (Cl. 65—107)

The present application is a continuation-in-part of application Serial No. 531,462 of James S. Golightly and Harold E. McKelvey, filed August 30, 1955, now abandoned, for "Method and Apparatus for Bending Glass Sheets to Compound Curvatures."

This application relates to method and apparatus for bending glass sheets to compound curvatures. Specifically, the present invention relates to an apparatus for providing the compound curvature to flat glass sheets necessary to bend the sheets into a configuration acceptable for the latest designs in vehicle glazing panels such as automotive windshields and backlights. Such designs require that the panels extend continuously from one side completely across the vehicle into the other side and include an additional auxiliary portion extending transversely of the longitudinal axis of the panel into the roof of the vehicle.

In order to bend glass sheets in two mutually perpendicular directions along axes having varying radii, many difficulties are encountered. Glass must be stretched unevenly during the bending operation, thereby causing optical distortion. In order to stretch glass in two mutually perpendicular directions, additional distortion is bound to occur. Furthermore, difficulties are encountered in reproducing such compound bends, especially when the windshields are produced at mass production rates.

When longitudinal and transverse bends are imparted to glass sheets in a non-continuous operation, such a process is too slow for mass production. It is far superior to perform the bending operation by a continuous process wherein flat glass sheets are mounted on a bending mold, conveyed continuously through a bending lehr heated to produce a hot atmosphere sufficient to soften the glass and removed from the lehr in the compound shape desired. The present invention provides apparatus including novel mold and lehr structure capable of accomplishing the complex longitudinal bend and the complex transverse bend required for compound windshields independently of each other, thus minimizing the resultant distortion and problems of reproducing the manufactured articles at high rates of production within the small tolerance permitted by automobile manufacturers. For the purpose of definition, a transverse bend is one in which a glass sheet is bent about an axis extending longitudinally of the sheet and a longitudinal bend is one in which the glass sheet is bent about an axis extending transversely of the sheet.

A glass bending device or mold according to the present invention includes a central molding member and outboard molding members movable relative to the central molding member. One embodiment of the latter comprises a smoothly curved side rail and a reversely curved side rail. Means is provided for imparting heat to a longitudinally extending, critical portion of glass carried adjacent the reversely curved side rail at a greater intensity than other portions of the sheet to assist the transverse bend. This means or heat-imparting member may comprise an electrical heating element attached to the support structure and movable into a position aligned with the longitudinally extending portion of glass when the glass sheet is mounted on the mold for bending, or a smoothly surfaced sheet of heat reflective material carried by the reversely curved side rail and extending longitudinally of the mold to reflect heat into the longitudinally extending portion of the glass sheet.

In the preferred embodiment containing an electrical heating element, the latter in the form of a longitudinally extending open coil is attached at each end to a trolley electrode. The coil is mounted on a pivotable frame adapted for movement of the coil over the longitudinally extending portion of the glass sheet defining the axis of most severe transverse bending. The electrodes move with the mold through a bending lehr and, at the proper portion of the bending cycle, engage a pair of bus bars mounted in the lehr. A potential difference is maintained between the bus bars. An electric voltage is impressed across the heating coil during the time the electrodes contact the bus bars. The coils radiate heat to the longitudinally extending portion of the glass sheet adjacent the reversely curved rail during passage of the mold through the portion of the bending lehr where contact is maintained between the electrodes and bus bars. The transverse bending of a critical area of glass may be effected by such apparatus independently of the longitudinal wrap-around bend produced by adjustment of overhead lehr heaters to provide a varying heat intensity pattern longitudinally of the sheet. Counterweighting the outboard molding members, which pivot relative to the central molding member, assists the heat softened glass to assume a complex longitudinal bend.

For compound bends including less severe transverse bends, we have found it possible to dispense with the electrical heating coils entirely and provide the localized heating needed for the transverse bend by placing a smoothly surfaced, rigid sheet of heat reflective material immediately outside the reversely curved side rail. The rigidity of the sheet enables it to help support the flat glass sheet prior to bending, and its smoothness facilitates sliding of the sheet during bending and reflection of heat from overhead lehr heaters into the critical longitudinal strip of glass it underlies.

A primary object of the present invention is to provide apparatus for bending glass sheets into compound curvatures.

Another primary object of the present invention is to provide an improved continuous method for bending glass sheets into compound curvatures.

Another object of the present invention is to provide apparatus for bending glass sheets into compound curvatures including a longitudinal bend of non-uniform severity and a transverse bend of non-uniform severity, which bends include severely bent regions.

Another object of the present invention is to provide a bending mold for bending glass sheets into compound curvatures utilizing electrical heating coils as part of the mold structure to effect at least one of the bends.

Still another object of the present invention is to provide apparatus for bending glass including a lehr provided with bus bars, and a bending mold provided with electric heating elements connected at their ends to electrical connectors which contact the bus bars during passage of the mold through a portion of a bending lehr.

These and other objects of the present invention will become more apparent upon studying the following recitation of typical embodiments of our invention which are described for purposes of illustration rather than limitation.

In the drawing forming part of the present invention,
FIGURE 1 is a plan view of a flat sheet of glass precut to a typical outline desired preparatory to bending.
FIGURE 2 is a perspective view of a typical bending mold according to the present invention showing the mold in closed position and looking at the mold from its rear.
FIGURE 3 is a rear elevation view partly in perspective of the bending mold of FIGURE 2, showing the mold in its spread position for receiving a flat sheet of glass precut for compound bending.

FIGURE 4 is a view similar to FIGURE 3, showing the mold in its normally closed position after completion of a bending cycle.

FIGURE 5 is a view similar to FIGURE 4 taken from the opposite side of the bending mold.

FIGURE 6 is an end elevation of the mold of FIGURE 2, partly in perspective, showing the mold in its closed position, with phantom lines indicating movement of an element.

FIGURE 7 is a longitudinal elevation, partly in section of a bending lehr forming part of the bending apparatus required by the mold depicted in FIGURES 2 through 6.

FIGURE 8 is a transverse section along the lines VIII—VIII of FIGURE 7.

FIGURE 9 is an enlarged partial longitudinal section along lines IX—IX of FIGURE 8.

FIGURES 10 and 11 are plan views, partly in perspective, of alternate embodiments of the present invention.

FIGURE 12 is a frontal view of still another embodiment of the present invention involving a combination of auxiliary electrical heating and the application of localized mechanical force to effect the transverse bend, showing means for inhibiting the application of the mechanical force.

FIGURE 14 is a view similar to FIGURE 13, showing the FIGURE 12 embodiment after the inhibiting means is tripped and the mechanical force applied.

Figure 13:
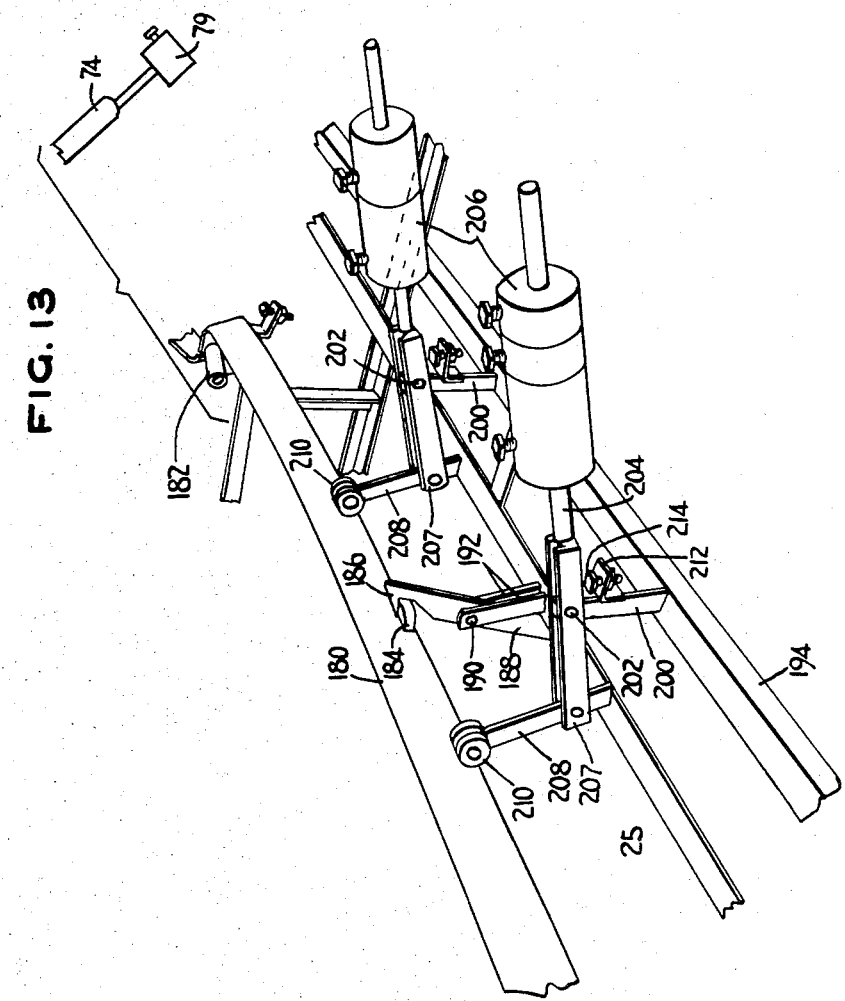
FIGURE 13 is an enlarged perspective view of a portion of the embodiment of FIGURE 12 showing the inhibiting means preventing application of the mechanical force.

Referring to the drawings, FIGURE 1 shows a typical precut glass sheet G having a main central portion 15 of modified elliptical shape, merging at its longitudinal extremities into wing portions 16 and 17 adapted to be "wrapped around" the sides of a vehicle, and an auxiliary portion 18 having a reversely curved side extending longitudinally at one side of the sheet. The latter portion is bent transversely of the main central portion 15 to extend into the roof of the vehicle. This sheet includes a smoothly curved side 19 opposite auxiliary portion 18. Side 19 forms the bottom of the bent panel as the latter is mounted in a vehicle.

Referring particularly to FIGURES 2 through 6, which show various views of a typical glass bending mold M according to the present invention, the device comprises a support structure including a longitudinally extending rail 25 and cross rails 26 fabricated of elongated angle irons. A longitudinally extending brace rod 27 connects the cross rails 26 to improve the rigidity of the support structure. Vertical posts 28 extend upwardly in pairs from each laterally extending beam 26. The upper ends of the front vertical posts are connected to a reversely curved front side rail 30. The other two vertical posts 28 are connected at their upper ends to a smoothly curved rear side rail 32.

The latter extends longitudinally of the mold between its longitudinal extremities 33 to form an arcuate structure adapted to support the central portion of one side margin of a glass sheet after bending. Side rail 30 is curved near its longitudinal extremities into a convexly curved portion 34 emerging into a substantially straight portion 36 and then into a concavely curved portion 38 near each longitudinal extremity 39 to conform to the outline of the central portion of the other side margin of the glass sheet after bending.

Outboard molding members 40, having front inboard extremities 41 and rear inboard extremities 42, are provided at the outboard extremities of the mold M. In the closed mold position shown in FIGURE 2, they extend in generally C-shaped configuration from adjacent longitudinal extremity 39 of rail 30 to adjacent laterally opposing longitudinal extremity 33 of rail 32. A counterweighted arm 50 provided with a counterweight 52 at its inboard extremity extends beyond the rear inboard extremity of each outboard molding member to which it is fixed. The counterweighted lever arm is provided with an ear 46 forming a hinge connection with a hinge rod 48.

At the front end of the mold, the inboard extremity of each outboard molding member is connected to a counterweighted lever arm 43 provided with counterweights 44 by means of an angular strap 54 (FIGURE 6). The latter is provided with a dog 56 apertured to receive the opposite end of the hinge rod 48 with which it makes bearing contact. Thus, the outboard molding members 40 are rotatable to a spread mold position relative to the rails 30 and 32, which are fixed to the support structure. The weights 44 and 52 cause the outboard molding members 40 to rotate about the hinge rod 48 into a closed mold position wherein rails 30 and 32 and outboard molding members 40 provide a substantially continuous frame conforming in both elevation and outline to the shape desired for the bent glass sheet.

Each of the vertical posts 28 contains an apertured lug 60 provided with an adjustable set screw 62. The vertical position of set screw 62 controls the amount that the outboard molding members 40 rotate relative to the fixed rails 30 and 32. When the counterweighted arms 50 and 43 rotate sufficiently, they contact the upper surfaces of the set screws, thereby preventing further rotation of the outboard molding members.

An angular support column 70, insulated from the mold structure at 71, is attached to an upright extending from each longitudinal extremity of the rail 25. Each column includes a pivot hinge 72 at its upper extremity. A counterweighted arm 74 is mounted for rotation about the hinge 72. Arm 74 also carries a pin 75, which extends outwardly therefrom to abut column 70 and limit its rotation. An electrode or electrical terminal 76 having a tapered end portion 78 is fixed to the end of the hinge rod 72 opposite that containing a counterweight 79. A loose, heavy, flexible wire 80 of a suitable metal having the requisite properties of conductivity, flexibility and freedom from oxidation at the lehr temperatures connects each electrode 76 to a connector 81. The heavy wires are electrically coupled to the extremities of heater coil 82 at the connector 81. Ceramic brackets 84 hold coil 82 onto an open support structure 86. Heater coil 82 is preferably of open coiled wire to enable heat radiated by overhead lehr heaters to pass through to the glass sheets undergoing bending. If the heater coil is held in a solid support rather than an open support, the critical strip of the glass beneath the coils 82 is shielded from the overhead lehr heaters, and the critical strip is prevented from being heated to the temperatures enabling facile softening by radiation from the energized coils. Heater coil 82 extends longitudinally of the mold to form a longitudinally extending heat-imparting member which heats the glass locally along a longitudinally extending region to help produce a sharply bent portion of a non-uniform transverse curve.

Support structure 86 includes a pair of vertical sleeves 88 fixed to the longitudinally extending beam 25, and a rod 90 slidable axially within each sleeve. Set screws 92 are included to fix the vertical position of the rods 90 within sleeves 88. Additional rods 94 are jointed to rods 90 at elbow joints 96. Sleeves 98 are adjusted axially relative to rods 94 and fixed in position by means of set screws 100. A rod 102 interconnects the sleeves 98. Branches 104 are connected to rod 102 to provide means for supporting the ceramic brackets 84.

Rails 30 and 32 are interconnected by an intermediate recessed cross beam 110 and diagonal braces 112. Cross beam 110 supports a vertical rod 114 upon which is mounted a sleeve 116 of flexible ceramic material which extends upwardly about ½ inch above the topmost edge of the vertical rod 114 and terminates at the location to which the glass is desired to sag in its bent configuration. This portion of the apparatus is taken from the invention described in a copending application, Serial No. 531,461 of James S. Golightly, David H. Doehlert and Charles R. Davidson, Jr., filed August 30, 1955, now abandoned, the description of which is incorporated herein by reference.

The mold may also be provided with heat abstractor plates 120 supported beneath adjacent the mold extremities on vertical posts 122 attached to support braces 124 connecting the bottom portions of the vertical posts 122 to the laterally extending beams 26. These heat abstractor plates absorb some of the heat reradiated from the ends of the glass and by virtue of their selective abstraction of heat from the glass extremities prevent undue curling of the glass in those regions outboard of the regions of severe longitudinal glass bending.

An elongated, smoothly surfaced, rigid sheet 130 of heat reflective material is attached to the laterally outboard side of the reversely curved rail 30. Auxiliary sheets 132 of this material may be located at each longitudinal extremity of sheet 130. Sheets 130 and 132 are angularly disposed with respect to and extend upwardly and obliquely from the reversely curved side rail 30 to help support the reversely curved extremity of flat glass sheets extending beyond the reversely curved rail 30 when the flat glass is mounted on the mold for bending.

The smooth surface of rigid sheets 130 and 132 enables a portion of the heat radiated from lehr heating elements located above the glass to be reflected into the critical longitudinally extending region of the glass that is to be bent most severely transversely. Since the heat imparted into this critical area is more intense than in other areas, the glass tends to bend more readily by heat softening in this localized region. The reversely curved edge of the glass sheet slides on the smooth surfaces of sheets 130 and 132 as the critical area bends until the glass edge coincides with the final bent position desired for the glass relative to reversely curved side rail 30.

The particular mold structure recited above is especially adapted for use in a bending lehr provided with bus bars. Referring especially to FIGURES 7 through 9, a bending lehr 140 is shown with an entrance 142 and an exit 144. Conveyor rolls 146 comprise a conveyor which carries molds M transversely through the lehr from its entrance to its exit. The conveyor extends successively through a preheat chamber 148, a longitudinal bending chamber 150, a transverse bending chamber 152 and an annealing chamber 154. Electrical heating elements 156 are mounted in sets on movable supports carried by the lehr roof. Voltage regulators are included in the power supply circuit (not shown) of each electrical element for varying the intensity of its power input. Laterally opposing bus bars are carried by opposite walls of the transverse bending chamber 152.

The lehr 140 also includes a number of windows 160 through which personnel can observe the bending operation. Operators can adjust the power input and the location of each individual set of electrical heating elements 156 relative to the passing molds in response to their observation of the pattern of bending resulting from the lehr operation. Observation is enhanced by utilizing the flexible ceramic sleeve 116 as a guide for indicating the amount of downward displacement of the center of the sheet during the bending cycle.

The operation of the mold just described is as follows. Outboard molding members 40 are rotated into a spread position separated from the longitudinally extending rails 30 and 32. Coil support bracket 86 is moved to a vertical position clear of the mold. For this purpose, elbow joints 96 are rotatable into a locked position for supporting the bracket 86 vertically in the position shown in FIGURE 3. Precut flat glass sheets are mounted on the opened mold and supported on the outboard extremities 39 and 33 of rails 30 and 32, respectively, and of outboard molding members 40. The bracket 86 is rotated to its horizontal position. Stops on elbow joints 96 prevent the bracket from rotating beyond its horizontal position.

The glass laden mold is then placed at the entrance 142 of the glass bending lehr 140. This is accomplished by mounting the transverse support means 26 upon conveyor rolls 146 which are rotated, thereby forcing the mold laterally through the preheat chamber 148 and the longitudinal bending chamber 150 to transverse bending chamber 152. The electrical heaters 156 located above the path of movement of the molds can adjust the local intensity of the heat pattern imparted to each longitudinal increment of glass passing thereunder by adjusting its location relative to the moving glass and the amount of electrical power supplied to each heater. Thus, the glass and the mold are first soaked with heat to a uniform temperature in preheat chamber 148 and then spaced, preselected portions transversely of the lehr (longitudinally of the glass) are subjected to more intense heat than the other portions of the glass in the longitudinal bending chamber 150. The glass sheet softens under the influence of the heat. The counterweights 44 and 52 urge the outboard molding members 40 to rotate, thus lifting the extremities of the glass relative to the central portion. The central portion sags to conform to the shaping surfaces defined at the upper surfaces of mold rails 30 and 32.

The molds are conveyed through the lehr at a speed chosen for best combination with the heating pattern in the various chambers so that when the longitudinal glass bend has been substantially completed, the molds move to a position within the lehr where the beveled leading portion 78 of the trolley electrodes 76 engage bus bars 158. Counterweights 79 urge the top surface of the trolley electrodes 76 into intimate sliding electrical contact with the bottom surface of bus bars 158. As the mold passes the region of the lehr containing the bus bars, the potential difference between the bus bars heats the coils 82, which radiate heat onto a thin, longitudinally extending, critical strip defining the axis of most severe transverse curvature. After the mold passes through the lehr chamber containing the bus bars, the electric heating element 82 is de-energized by disengagement of trolley electrodes 76 with bus bars 158.

Mounting the trolley electrodes 76 on counterweighted arms 74 improves the electrical contact between the electrodes and bus bars 158, because contact is made at the bottom surface of the bus bars where there is little chance for the deposit of dust and other particles inhibiting intimate electrical contact. The upper surface of trolley electrodes may be wiped between passes of the mold through the lehr, if necessary to remove dust particles. Cleaning the upper surfaces of the bus bars is a major operation that may impair the continuous operation of the bending lehr.

Referring to FIGURE 10, another embodiment of a glass bending mold is shown. However, this structure is limited in its use for bending glass to compound curvatures including a relatively gentle transverse curvature of nonuniform severity. This embodiment comprises a heat imparting member in the form of a heat reflector sheet extending longitudinally of the mold instead of the longitudinally extending heating coil 82 of the previous embodiment. In such apparatus, the smoothly surfaced sheet of the heat reflective material 130 reflects sufficient heat radiated by the lehr heaters 156 into the local critical region to be bent transversely without requiring use of the electrical heating elements 82 and trolley connectors 76 with lehr bus bars 158. For such apparatus, the total heat received by the critical region directly from the lehr electrical heating elements 156 and by reflection from sheet 130 is sufficient to soften the critical strip of glass more rapidly than the other strips of the sheet parallel to the critical strip to produce the desired transverse bend.

In this embodiment, when the flat glass sheet is mounted for bending on a spread mold, the longitudinal extremities of its wing portions 16 and 17 rest on the longitudinal outboard extremities of the outboard molding members 40, the side edge of auxiliary portion 18 is supported along a major portion of its length on slide 130 above and beyond mold rail 30, while the smoothly curved side edge of side 19 is supported on spaced points at the longitudinal extremities 33 of rail 32. When this mold is loaded with one or more flat glass sheets in such a manner, the sheet is initially supported in a given plane above the shaping surface of the mold. When the glass laden mold is conveyed transversely through a bending lehr, the intensely heated strips soften more rapidly than the remainder of the sheet and the counterweighted outboard members rotate upwardly to impose their shape upon the heat softened glass wing portions 16 and 17. Central portion 15 and side portions 18 and 19 remain relatively rigid during this phase of the bending cycle. However, auxiliary portion 18 begins to slide along slide 130 when the central portion 15 begins to sag in response to additional heat and, while sliding, rotates at an angle to the plane of initial support about an axis extending substantially parallel to the longitudinal axis of the mold. Side portion 19 sags longitudinally about an axis extending transversely of the mold an amount limited by the upper shaping surface of rail 32. The central portion of the sheet is thus rotated both longitudinally and transversely with the auxiliary side portion 18 being deposited upon rail 30 of the mold after the transverse bend is completed. The transverse bend is a maximum between the supported sides of the glass where the local heat intensity transversely of the sheet is a maximum because of the additional heat reflected locally. The bent sheet must be cooled as soon as the compound bend is completed as in the other embodiment to prevent excessive sagging.

The apparatus of FIGURES 2 through 6 or that of FIGURE 10 may be modified additionally as seen in FIGURE 11 by providing an open mesh wire screen 161 mounted in cantilever fashion to the support structure. Angle bars 162, each having a horizontal portion 164 and a vertical portion 166, support the screen. The vertical portions are locked by lock nuts 169 within a pipe 168 carried by a support lug 170 fixed to a rail 171 of the mold support structure. The screen 161 is reinforced by an arcuate reinforcement 172 whose ends are interconnected by a beam 174. Horizontal portions 164 are secured to beam 174 by welding to support the latter.

In such a structure, the flat glass is first mounted on the mold and then the open mesh screen structure is attached to the mold structure by inserting vertical portions 166 into the pipes 168 and securing them by tightening the lock nuts 169. The provision of the screen inhibits undue bending of the portion of the glass which is to be maintained flat relative to the other regions of the compoundly bent sheets. The transverse bend imparted to the glass sheets by this embodiment is localized in the region between the side edge of auxiliary portion 18 and the portion of glass aligned with the laterally inboard boundary of the mesh screen 161. The latter, in inhibiting softening of side portion 19 and part of central portion 15 of the sheet, inhibits the side portion 19 from sagging or bending transversely of the remainder of the sheet.

For extremely complex bends, it may be necessary to replace the reversely curved molding member 30 with a rotatable member 180 mounted on hinges 182 for rotation on an axis extending longitudinally of the mold relative to the smoothly curved side rail 32, and provided with means urging member 180 to rotate into a position forcing a transverse bend. Such a structure is depicted in FIGURES 12 through 14.

Rotatable side rail 180 includes an eye 184 engageable by a hook 186 of a pivotable latch 188 mounted for rotation about a pivot rod 190 held by a twin plate member 192 secured to rail 25 of the support structure for the mold. A rail 194 supports a pair of posts 200 each supporting a stub bearing rod 202 at its upper end. Lever arms 204 are rotatable about stub bearing pins 202 and are counterweighted at one end at 206 and bifurcated at 207 for swivel connection to a hinge 208 at the end opposite the end carrying the counterweight. The end of the hinge is connected in pivotable relation to the rotatable rail 180 by means of a pivotable housing 210. Each post 200 contains an apertured lug 212 through which a set screw 214 is secured in screw-threaded relationship.

Rotatable rail 180 is maintained in its outermost position by engagement of hook 186 with eye 184 until a desired phase of the bending cycle. At this point, the latch 188 is pivoted, thus disengaging hook 186 from eye 184 and permitting the counterweights 206 to rotate lever arms 204 to raise hinges 208, bearing brackets 210 and rotatable side rail 180 an amount limited by engagement of lever arms 204 with set screws 214. This action is coordinated with the engagement of the trolley electrode 76 with bus bars 158 in the transverse bending section of the lehr.

Referring again to FIGURES 7 through 9, the portion of the bending lehr containing the transverse bending section 152 may also be provided with a series of lugs 220, each connected to a rotatable bar 222 extending through bearing brackets 224. A counterweighted arm 226 having a counterweight 228 extends angularly from the rotatable rod 222. The lehr wall is grooved at 230 for movement of a stop pin 232. When the latter is moved inwardly within the recess 230, counterweighted lever arm 226 is free to rotate thereby rotating lug 220 into a position to contact the bottom of pivot latch 188, thereby causing the latter to rotate so that its hook 186 becomes disengaged from eye 184 carried by the rotatable rail 180. A number of lugs 220 are provided within the transverse bending chamber of the bending lehr in order to provide flexibility for the imposition of the moments of force tending to cause the transverse bending of the glass. The moment provided by counterweight 228, while sufficiently large to rotate lug 220 into its latch rotating position, is insufficient to prevent counterrotation of the lug upon abutment by rigid portions of the mold support frame as the latter pass through the transverse bending section of the lehr.

When the stop pins 232 are pulled outwardly, they inhibit rotation of the counterweighted lever arm 226 and the lugs 220 are held completely below the line of engagement with the bottom of latches 188. Thus, as the molds M move through the lehr they are free to clear all but the lug desired to initiate the transverse mechanical bending action.

The disclosure above of particular embodiments of our invention has been for illustration rather than limitation. For example, the bus bars 158 may be located beneath the mold and stub rolls substituted for the elongated conveyor rolls 146 illustrated and a central aperture provided in the lehr floor for passage of electrical connectors. In such an embodiment, leads 80 extend below the lehr through the central floor opening, where they are subjected to less intense heat than in the upper portions of the lehr.

For a particular example wherein the sheet of FIGURE 1 is to be bent so that its wing portions 16 and 17 are to be bent sharply longitudinally of the sheet and the auxiliary portion 18 is to be bent sharply transversely of the sheet, the heating pattern imparted to the various sections of the lehr is important. In the preheat section 148, each row of heaters extending transversely of the longitudinal axis of the movement of the glass is heated to impart a uniform transverse temperature pattern to the glass and mold passing therebeneath. Each succeeding row of heaters in the preheat section imparts heat at a higher intensity to the passing glass and mold.

In the longitudinal bending section 150, the heaters are energized in a different pattern. The heaters in each row are energized to different intensities so that the column of heaters overlying those regions of glass destined for severe curvatures are energized to higher voltages than the other heaters in this lehr section. The heat intensity pattern intersected by the glass sheets in their lateral movement through lehr section 150 comprises two spaced regions of high intensity separated by a region of relatively moderate intensity. The bending moments resulting from the mechanical forces of the counterweighted outboard molding members 40 on the glass act locally on the strips of glass passing beneath the columns of high intensity heaters, thus helping to impart the severe curvature in the proper locations along the longitudinal bend.

In the transverse bending section 152, the intensity pattern across the rows of heaters 156 is more uniform than in the longitudinal bending section. In this section, the engagement of the trolley electrodes 76 with bus bars 153 energize the heating coils 82, which overlie the critical strip defining the transverse curvature desired for the glass. Since the heating coils move with the glass, a heating pattern of non-uniform intensity is established transversely of the glass, with the critical strip requiring maximum transverse bending subjected to the most intense heating, during the period the electrodes contact the bus bars. The critical strip bends more readily than other strips parallel thereto to help provide the desired transverse bend.

For practical purposes, the longitudinal bending section 134 and the transverse bending section 136 may be combined in a single lehr section wherein both bends may be performed simultaneously. This is especially true when the precut glass is shaped in the manner described in copending application Serial No. 527,536 of Ewell C. Miles, filed August 10, 1955, now U.S. Patent No. 2,924,485.

In the annealing section, each row of heaters is heated in such a manner as to equalize the temperature throughout the glass sheet and to provide for cooling of the glass as it proceeds through this section. Such an intensity pattern need not be uniform across any row of heaters.

Once the transverse bend is completed as viewed through the lehr windows, the molds may be accelerated toward the annealing section by coupling high speed motors to the desired conveyor rolls by means of selective clutches (not shown). However, when the lehr is adjusted properly and a large batch of sheets is to be bent to a particular shape, the molds are conveyed through the lehr at a constant speed.

The references to the front side rail 30 and rear side rail 32 and the front and rear views of the mold in the description of the drawings refer to the orientation of the bending mold as it is conveyed laterally through a bending lehr. Since the front side of the mold is continually exposed to higher temperatures than its rear side during the heating phase of the bending cycle, if the bending cycle is conducted slowly enough to induce a transverse sag due to heat softening, the transverse sag tends to become offset from the longitudinal axis passing through one center of the sheet and is most pronounced toward the front side of the laterally conveyed mold even though no special structures such as reflectors, shields, or electrical heating elements are incorporated to localize the severity of the transverse bend. However, this natural tendency of displacement for the transverse sag is not appreciable when glass sheets are bent commercially at mass production rates, but is a sufficient factor to capitalize in orienting molds for transverse conveyance through a bending lehr. If molds containing special structure for producing non-uniform transverse bends are oriented so that the axis of most severe curvature is located adjacent the rear side rather than the front side of the mold, the natural displacement of the maximum transverse sag toward the front side must be overcome and may even result in the establishment of a transverse wave in the bent glass. Orienting the mold with its front side adjacent the region of maximum transverse sag requires less local heat for its production because the natural tendency of the transverse sag to gravitate toward the front side enhances the effect desired of localizing the transverse bend.

The description of the embodiment above has been for illustration rather than limitation. Reference to the latter may be obtained from studying the accompanying claims.

What is claimed is:

1. Apparatus for shaping an elongated glass sheet into a compound curvature including a non-uniform longitudinal curve comprising a pair of spaced, localized, severely bent regions bent about axes extending transversely of said sheet and a non-uniform transverse curve comprising only one localized, severely bent bent region bent about an axis extending longitudinally of the sheet, said apparatus comprising a mold including a central molding member comprising a pair of laterally spaced side rails extending longitudinally of the mold, outboard molding members pivotable relative to said central molding member about an axis extending transversely of said mold into a spread mold position to receive a flat glass sheet for bending and into another mold position in close proximity to the central molding member to provide therewith a substantially continuous shaping surface conforming in elevation and outline to the shape desired for the bent glass sheet, mold support structure including cross rails for supporting said mold for movement in a direction transverse to its longitudinal axis, and a longitudinally extending heat imparting member attached to said apparatus and extending longitudinally of said mold in spaced relation to the shaping surface and positioned on said apparatus so as to face a surface of an area extending longitudinally of the glass sheet when supported on said mold.

2. Apparatus as in claim 1, further including a glass sheet edge support member for supporting the glass sheet along one longitudinal side edge only in sliding relation thereto, said glass sheet edge support member comprising a smoothly surfaced rigid sheet extending lengthwise of one of said longitudinally extending side rails laterally outboard thereof and disposed obliquely upwardly and outwardly laterally of said one side rail for supporting the one side edge of a flat glass sheet laterally outboard of the localized severely bent region of the non-uniform transverse curve, said other longitudinally extending side rail being free from a smoothly surfaced rigid sheet adjacent thereto.

3. Apparatus as in claim 1 wherein said longitudinally extending heat imparting member comprises an electrical heating element movable into a position aligned with a longitudinally extending area located intermediate said side rails.

4. Apparatus as in claim 3 wherein the electrical heating element comprises an open electrical heating coil.

5. Apparatus as in claim 3 further including an electrical terminal attached to said support structure beyond the outboard longitudinal extremity of each outboard molding member and in electrical connection with each extremity of said electrical heating element, a tunnel-like lehr comprising an entrance, an exit, side walls extending the length of said lehr, a conveyor for transporting a mold support structure transversely through the lehr and a transverse bending chamber, a pair of laterally opposed stationary bus bars extending lengthwise along said side walls within said transverse bending chamber in a plane extending through both said side walls each adapted for movable electrical contact by an electrical terminal and means for imparting a potential difference between said bus bars.

6. Apparatus as in claim 5, further including means to support said electrical terminal in pivotal relation to said support structure, means operatively connected to said electrical terminal support means to urge said electrical terminal to pivot upwardly, and rotation limiting means operatively connected to said electrical terminal and said electrical terminal support means, whereby said electrical terminals make contact with the bottom surface of said bus bars to energize said electrical heating element and intensify the heating of said longitudinally extending area as said mold traverses said transverse bending chamber.

7. A tunnel-like lehr comprising an entrance, an exit, side walls extending the length of said lehr, a conveyor for transporting a mold support structure transversely through the lehr and a transverse bending chamber, a pair of laterally opposed stationary bus bars extending longitudinally along said side walls within said transverse bending chamber in a plane extending through both of said side walls for movable electric contact by electrodes carried by a mold as the latter is conveyed on said mold support structure through said transverse bending chamber and means for imparting a potential difference between said bus bars.

8. Apparatus for shaping an elongated glass sheet into a compound curvature including a non-uniform longitudinal curve comprising a pair of spaced, localized severely bent regions bent about axes extending transversely of said sheet and a non-uniform transverse curve comprising only one localized, severely bent region bent about an axis extending longitudinally of the sheet, said apparatus comprising a mold including a central molding member comprising a pair of laterally spaced side rails extending longitudinally of the mold, outboard molding members pivotable relative to said central molding member about an axis extending transversely of said mold into a spread mold position to receive a flat glass sheet for bending and into another mold position in close proximity to the central molding member to provide therewith a substantially continuous shaping surface conforming in elevation and outline to the shape desired for the bent glass sheet, a glass sheet edge support member for supporting the glass sheet along one longitudinal side edge only in sliding relation thereto, said glass sheet edge support member comprising a smoothly surfaced rigid sheet extending lengthwise of one of said longitudinally extending side rails laterally outboard thereof and disposed obliquely upwardly and outwardly laterally of said one side rail for supporting the one side edge of a flat glass sheet laterally outboard of the localized severely bent region of the non-uniform transverse curve, said other longitudinally extending side rail being free from a smoothly surfaced rigid sheet adjacent thereto.

9. In apparatus for bending glass sheets to nonuniform sharp curvature bends that are asymmetrical with respect to their longitudinal axis, the combination with a mold upon which flat sheets are adapted to be bent when exposed to bending temperatures, of pivotable endmost molding members each having an upper shaping surface forming a continuation of the upper shaping surface of a molding member next adjacent thereto in one position and having an end portion thereof disposed in a given plane for supporting an end portion of a flat glass sheet in another position, with flat glass sheet engaging means for engaging a flat glass sheet intermediate its end portions when said endmost molding members occupy said other position, said flat glass engaging means comprising first flat glass support means engageable in said given plane with one longitudinal side edge area of a flat glass sheet at spaced points only therealong and second flat glass support means engageable in said given plane with the opposite longitudinal side edge area of the flat glass sheet only along a substantial portion of the length thereof when said endmost molding members occupy said other position.

10. In a method of bending glass in sheet form to compound curvatures including a transverse bend about an axis extending longitudinally of said sheet and having a portion of maximum severity offset with respect to the longitudinal axis intersecting the center of the sheet wherein the sheet is exposed to glass softening temperature, the improvement comprising orienting the sheet with the side adjacent the portion to be bent to said maximum severity disposed as the leading side and substantially parallel to said axis of bending, conveying the sheet so oriented through regions of successively higher temperatures including a region maintained at glass softening temperature, thereby exposing said leading side to simultaneously higher temperatures than its trailing side until the glass sags about an axis extending longitudinally of said sheet closer to said leading side than said trailing side.

11. A method of heating and bending a glass sheet about both the longitudinal and transverse axes thereof, comprising conveying the sheet transversely through a bending furnace while supporting said sheet in contact with the uppermost portions only of the shaping surface of a mold having an upwardly directed shaping surface, and with the central portion of one longitudinal side edge supported out of contact with said shaping surface retarding the heating of a central portion of the sheet inwardly of the ends thereof and heating the sheet outwardly of said central portion and adjacent the ends to bend the sheet about the transverse axis thereof and into more intimate contact with the shaping surface of the mold, and after the sheet has contacted the mold shaping surface applying a greater amount of heat to the central portion of the sheet along an elongated area substantially parallel to the longitudinal sheet axis and spaced inwardly from opposed supported longitudinal sheet edges to cause the sheet to sag between the longitudinal edges thereof and bend said sheet about the longitudinal axis thereof.

12. A method of bending a glass sheet as defined in claim 11, wherein a central portion of the sheet lying predominantly to one side of the longitudinal sheet axis has the heating thereof retarded while heat is concentrated on the central portion of the sheet.

13. A method of bending glass sheets about both the longitudinal and transverse axes thereof, comprising locating a sheet in contact with the uppermost portions of the shaping surface of a concave mold having a contour to which the marginal edges of the sheet are to be bent while heating the sheet to bending temperature, supporting the center portion of one of its longitudinal marginal edges out of contact with said shaping surface, lifting opposite ends of the sheet upwardly while bending the other longitudinal marginal edge of the sheet intermediate the ends thereof into more intimate contact with the mold shaping surface, maintaining the central portion of said one longitudinal marginal edge of the sheet above the mold until after the other sheet edge has contacted the mold shaping surface whereby the sheet begins to bend laterally between the other edge portion which has contacted the shaping surface and the opposite longitudinal edge, and after the other marginal edge has contacted the mold shaping surface bending the remainder of the sheet into contact with said shaping surface.

14. A method of bending glass sheets as defined in claim 13, wherein the portion of the opposite longitudinal sheet edge opposite the portion contacting the mold is initially supported above the mold in a substantially horizontal plane for a substantial portion of its length intermediate the ends thereof.

15. A method of bending glass sheets as defined in claim 14, wherein the first longitudinal sheet edge is supported in a substantially horizontal plane until received upon the mold shaping surface.

References Cited by the Examiner

UNITED STATES PATENTS

| | | | |
|---|---|---|---|
| 2,111,392 | 3/1938 | Galey | 65—273 |
| 2,125,912 | 8/1938 | George et al. | 219—36 |
| 2,176,999 | 10/1939 | Miller | 65—107 |
| 2,215,228 | 9/1940 | Oliver | 65—107 |
| 2,398,525 | 4/1946 | Gray | 65—152 |
| 2,398,874 | 4/1946 | Weyhing | 219—36 |
| 2,450,297 | 9/1948 | Pearse et al. | 65—107 |
| 2,452,488 | 10/1948 | Paddock et al. | 65—107 |
| 2,551,606 | 5/1951 | Jendrisak | 65—107 |
| 2,633,673 | 4/1953 | Bamford | 65—291 |
| 2,646,647 | 7/1953 | Bamford et al. | 65—103 |
| 2,671,987 | 3/1954 | Jendrisak | 65—158 |
| 2,683,334 | 7/1954 | Rugg et al. | 65—107 |
| 2,691,854 | 10/1954 | Rugg | 65—26 |
| 2,736,140 | 2/1956 | Black | 65—291 |
| 2,761,248 | 9/1956 | Cowley et al. | 65—152 |
| 2,774,189 | 12/1956 | Jendrisak | 65—290 |
| 2,871,623 | 2/1959 | Marini | 65—107 X |
| 2,893,170 | 7/1959 | Carson. | |
| 2,897,632 | 8/1959 | Fowler et al. | 65—288 X |
| 2,999,338 | 9/1961 | Richardson | 65—289 X |
| 3,086,376 | 4/1963 | Carson et al. | 65—288 |
| 3,089,319 | 5/1963 | Carson et al. | |

FOREIGN PATENTS 660,824  11/1951  Great Britain.

DONALL H. SYLVESTER, *Primary Examiner.*

BENJAMIN BENDETT, *Examiner.*

F. W. MIGA, *Assistant Examiner.*